United States Patent [19]

Gray et al.

[11] Patent Number: 4,872,054

[45] Date of Patent: Oct. 3, 1989

[54] VIDEO INTERFACE FOR CAPTURING AN INCOMING VIDEO SIGNAL AND REFORMATTING THE VIDEO SIGNAL

[75] Inventors: Michael J. Gray, Novato; Michael J. Franco, San Rafael, both of Calif.

[73] Assignee: Adaptive Video, Inc., San Rafael, Calif.

[21] Appl. No.: 213,028

[22] Filed: Jun. 30, 1988

[51] Int. Cl.⁴ .......................... H04N 7/01; H04N 5/04
[52] U.S. Cl. ..................................... 358/140; 350/148; 364/413.13
[58] Field of Search ....................... 358/140, 141, 148; 364/521, 413.13; 340/744, 747

[56] References Cited

U.S. PATENT DOCUMENTS

| | | | |
|---|---|---|---|
| 4,658,293 | 4/1987 | Arai et al. | 358/140 |
| 4,743,970 | 5/1988 | Barnett et al. | 358/140 |
| 4,764,870 | 8/1988 | Haskin | 364/413.13 |
| 4,777,486 | 10/1988 | Abraham | 364/521 |

FOREIGN PATENT DOCUMENTS 0212784  3/1987  European Pat. Off. ............ 358/140

Primary Examiner—John K. Peng
Attorney, Agent, or Firm—Pollock, Vande Sande & Priddy

[57] ABSTRACT

Video interface for converting a video input signal of one format to a video signal of a second format. Microprocessor control system stores executable script commands, identifying parameters of an incoming video signal and a desired outgoing video signal. An input video template is created, replicating all the pulse events contained in an input video signal. The template is phase locked with the incoming video signal synchronizing an internal pixel clock with the active line period of the incoming video signal. A video output template is created from the executable script for defining an output video signal timing format. The microprocessor-based system provides for complete diversity in capturing an input video signal of one format and converting the same to a different format for display or copying by a peripheral device.

16 Claims, 10 Drawing Sheets

VIDEO INTERFACE FOR CAPTURING AN INCOMING VIDEO SIGNAL AND REFORMATTING THE VIDEO SIGNAL

BACKGROUND OF THE INVENTION

The present invention relates to apparatus for converting a first specified input video signal of a first pixel and line rate to a second specified output video signal of a second pixel and line rate. Specifically, the apparatus captures and digitizes a still frame video image from the incoming video signal and reformats the image and any included alphanumeric overlay to conform to a second video format specification.

Shortly after the invention of television, a video standard (NTSC) was adopted for use by manufacturers of home video or consumer video electronics products. Among other specifications, the standard defines the number of picture elements (pixels) composing a line, the number of horizontal lines composing a video frame, and the sequence and rate of transmitting the lines. As a result of the NTSC standard in the United States and the PAL standard in Europe, commercial televisions, video cameras and video tape recorders based on a given standard are mutually compatible and capable of interchanging images by means of analog signals.

Today, many specialized computer-based imaging devices are unable to adopt the earlier video standards as a video output format because their still frame video images are defined by more pixels per line, more lines per frame, or require a higher transmission rate than that specified by existing standards. Among applications for these specialized video signals are Landsat imaging, computer-based medical imaging, computerized image printing, computer graphics, computer aided design, and non-destructive product testing and inspection. Their non-standard video output signal specifications render them incompatible with each other and with any of the more widely available standardized equipment such as video tape recorders, laser image printers, closed circuit video cable networks and video transmission systems.

This invention is designed to adapt the specialized, non-standard video output signals and image formats to either a specified video standard signal or any other non-standard video specification and image format for the purpose of compatibility or interconnection of the respective sending and receiving devices. Acting in this capacity, the apparatus may function as a video interface, as a remote image acquisition system, or as a front-end image processor for a laser film recorder. The invention is especially useful in medical imaging systems.

There are currently five (5) major medical imaging modalities that produce diagnostic images from computer processing of data produced by specialized sensing techniques. They are Computerized Axial Tomography (CAT), Magnetic Resonance Imaging (MRI), Ultrasound (US), Nuclear Medicine (NM), Digital Radiography (DR), specifically Digital Chest (DC), and Digital Subtraction Angiography (DSA). Most ultrasound devices produce NTSC standard video because they were intentionally designed to store their image information on commercial video tape recorders. However, the other modalities were intentionally designed to display more pixels per line and more lines per frame, and at higher transmission rates in order to present the maximum amount of image information on their respective display screens and to avoid distracting screen flicker. These non-standard video specifications are a result of placing primary design emphasis on medical diagonosis, at the expense of compatibility with each other, with any standardized video equipment, and with certain other valuable peripheral devices.

However, secondary to the principal desire to produce a diagnostic quality screen display of the images, imaging professionals would like to be able to transfer the non-standard images to peripheral archiving, printing and telecommunications devices. Among the most desirable applications for such peripherals are video tape archiving for subsequent review, laser recording of the images on film also for archiving and subsequent review, and telephone transfer of the images to another site for redisplay and confirmation of the diagnosis.

It is currently difficult or impossible to connect most medical imaging devices to video tape recorders, laser film recorders and so-called teleradiology systems either by digital or video interfacing techniques because of the inherent incompatibility of the host computers and video output specifications of these devices. Therefore, these three examples are immediate and principal applications for the invention based on its ability to convert the non-standard video outputs of the medical imaging devices to the requirements of any otherwise incompatible peripheral or video device.

In one such application of the invention, non-standard high resolution images produced by CAT, MRI, NM, DC and DSA could be acquired directly from the imaging devices, converted to the NTSC standard and archived on a video tape recorder. In a second application, similarly acquired images could be converted and transferred by the apparatus to a laser film recorder for printing. In a third application, the apparatus could convert and then transfer such acquired images to a teleradiology system for communication to a distant site. In these last two applications, the apparatus can either convert the images to the appropriate video specification or digital format and subsequently transfer them to the receiving device as either a video output or transfer them across a digital bus as a digital output. Current methods of interfacing medical imaging devices directly to laser film recorders and teleradiology systems, including digital interface and customized video interfaces, produce less than desirable results. The current methods of digital connection by means of direct serial or parallel interfaces are generally cumbersome to use, unable to accommodate alphanumeric overlays without significant distortion, slow in performance, expensive and functional only in limited cases. The current direct video interfaces are generally based on modifications of standard video digitizers. Although they are easier to use, their performance is often imprecise. Cropped image, linear distortions, predictable pixel duplications throughout the image, damaged alphanumerics and other difficulties are commonly seen.

For the teleradiology application, an indirect method of image transfer is currently being used. It is based on the use of a standard video camera connected to a standard video digitizer incorporated in the teleradiology system. The medical images are first transferred photographically to transparency film. The transparency-based image is then backlit by a lightbox, and photographed by the video camera The camera's standard video output is then digitized by the teleradiology system's video digitizer.

The use of the present invention is easier and more accurate than the indirect video method, and the image quality resulting from the use of the apparatus is far superior Another way of improving the digitizing process includes laser scanners which are inherently capable of much higher resolution than can be used in the teleradiology application and thus must be supported by computer systems that can reduce the data to the requirements of the teleradiology video.

A principal motivation of the present invention is the ability to reformat and transmit images during a patient examination due to its nature of being connected on-line to the imaging system. More effective consultations can be conducted as additional images can be produced during the present patient examination.

SUMMARY OF THE INVENTION

An object of this invention is to provide an interface between a source of video information having one format, and a video device configured to operate with a different video format.

It is a more specific object of this invention to regenerate from an incoming video signal basic pixel synchronization data to permit precision capture of the incoming image detail.

It is yet another object of this invention to provide a processor driven interface having selectable input/output formats, permitting a multitude of input video signal formats to be captured and reformatted in accordance with a selected video output format.

These and other objects of the invention are provided by a microprocessor-driven video interface. The interface will, during a capture mode, accurately capture, digitize and store the input image data in a display memory. The stored frame of video image data may be enhanced and transmitted to an output port as either serial digital pixel data or as an analog signal having a format different from the input video signal.

During the acquire mode, a video signal template is created based upon a menu selected set of stored parameters. The parameter lists identify the theoretical time duration and amplitude reference levels for all the pulse events contained in a selected video signal format. The video signal template synthesizes the input video signal pulse events. The internal pixel clock phase is adjusted to bring the template and incoming signal into time agreement.

The pixel clock phase is thus accurately located and remains synchronized with the incoming video signal The incoming video signal may then be accurately digitized.

The stable pixel clock reduces the amount of visible noise which is present in sampled video signal systems. The overall picture fidelity is maintained so that the important image detail necessary in medical imaging is not compromised. A standard graphics engine stores each pixel in a display memory where the image frame can be enhanced or modified by the graphics engine.

The acquired image frame may be formatted into an output video signal according to any number of video formats. The operator may menu select another parameter list in a display mode to regenerate a different video signal format. The graphics engine can then produce a pixel output signal corresponding to the new format. Output synchronization signals are also generated based on the output parameter list to synchronize the newly-created video image output signal.

DESCRIPTION OF THE FIGURES

FIGS. 3A, 3B-1, 3B-2 illustrate different types of a video frame to be captured by the interface device.

DESCRIPTION OF THE PREFERRED EMBODIMENT

Figure 1:
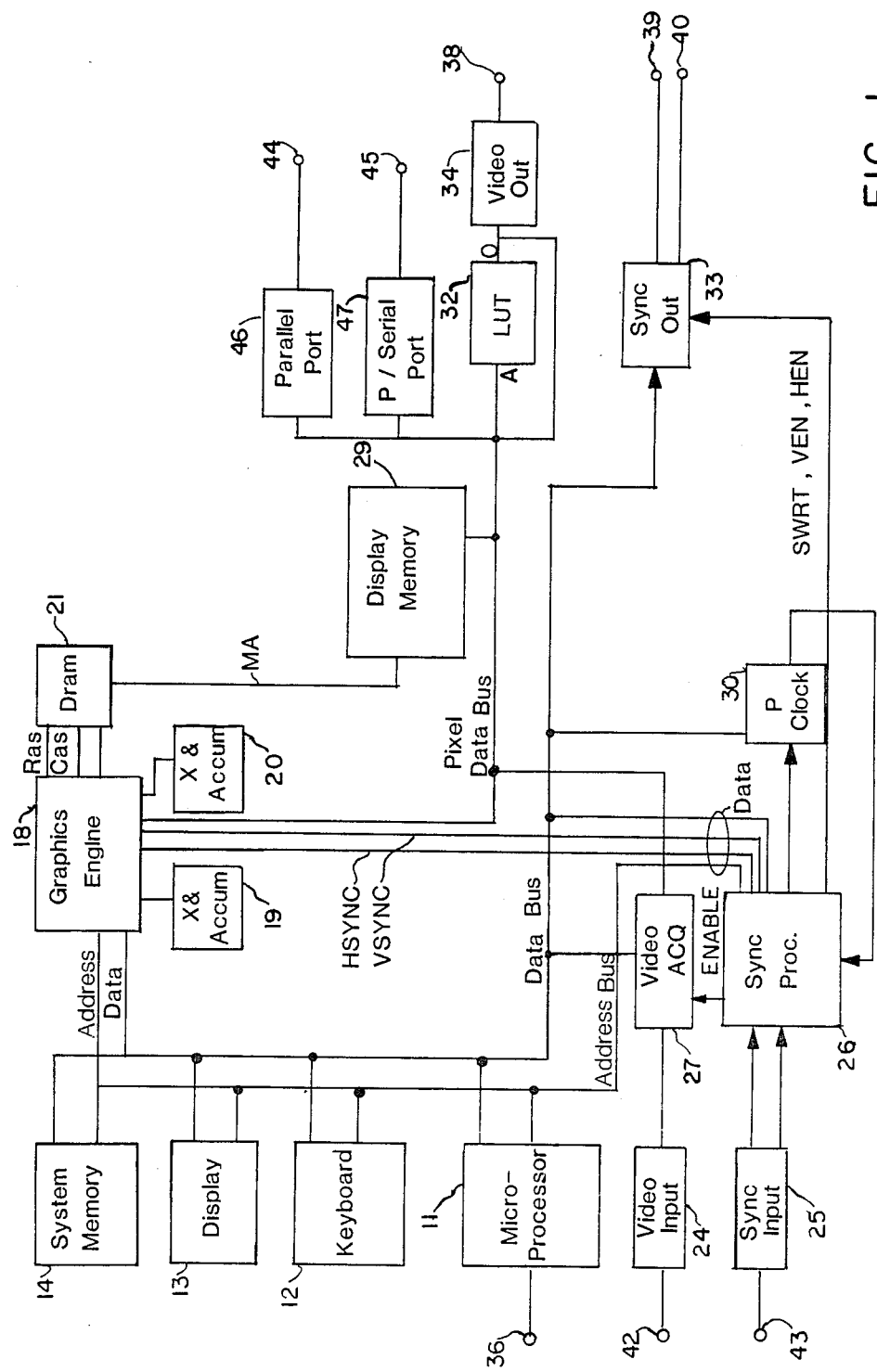
FIG. 1 is a block diagram of the interface device in accordance with the invention.

Referring now to FIG. 1, there is illustrated an embodiment of the present invention. The interface device of FIG. 1 is designed for single frame video image capture and redisplay in a format different from the host device which supplies the video signal. The system is a microprocessor based system, including a microprocessor (11) and keyboard (12) for controlling the interface through a menu driven system software. A display (13) permits display of the various menus- which control the operating system software. A system memory (14) is provided which includes all of the operating system and application software for operating the microprocessor (11).

As part of the operating system for microprocessor (11) menus are provided for selection of an input format corresponding to the video parameters of a video signal to be captured and stored in the video display memory (29). This parameter list, which will be described in greater detail, identifies all the synchronization events, as well as line lengths and frame lengths which are present in the incoming video signal frame. Additionally, an output menu script selected by the operator will configure synchronization output module (33) to provide horizontal and vertical synchronization in accordance with the synchronization format of a connected display or recording device. The output script will also identify the pixel rate, contrast and other video parameters for the output active video. Sync processor (26) will generate timing signals for the output video template.

The embodiment of FIG. 1 also includes a graphics engine (18), associated memory (21) and multiplier and accumulators (19) and (20). The graphics engine (18) may be a standard graphics engine, such as the Texas Instrument Type TMS 34010, which is capable of enhancing video pixel data contained in the display memory (29). Various graphic enhancements, such as zoom, alphanumeric data transfer, and generation are implemented once the captured video frame is entered in the display memory (29). Multiplier and accumulators (19) and (20) comprise a kernel processor which is capable of providing the calculation of a partial fraction and their residuals. It allows a single instruction of the 34010 graphics engine to process each pixel. Two kernel processors are used because the 34010 graphics engine moves two pixels at a time.

The kernel processor includes memory mapped into the 34010 address space which is basically a multiplier and accumulator with a FIFO 18 bits by 1024 pixels long. The kernel processor is used to calculate partial fractions and is used to compute the correct coefficient for a particular line of data and loads it into a register. The processor proceeds to fetch the first pixel in the line and writes it to the address which is the input into the kernel processor, automatically multiplying that pixel value by the coefficient for that line and stores the result in the FIFO. The 34010 then inputs all subsequent pixels into the same address and the FIFO is automatically incremented each time it writes to the address. When the 34010 arrives at the end of the line, it changes the coefficient to that which is suitable for the next line and begins pushing in successive pixels in the second line, with the kernel processor automatically multiplying the new pixel value times the coefficient. The pixel or partial sum to be added to the new result is recalled, and the new result is then transferred back into the FIFO, creating a technique of automatically generating the sum of partial fractions to formulate the interpolated value. This process is first performed horizontally and then applied vertically.

In order to acquire the video signal being supplied by a host device, the video signal which is in most instances analog, is applied along with synchronization signals to terminals (42) and (43) of the interface device. The synchronization signals are digitally filtered in sync input circuit (25) and separated into vertical and horizontal synchronization events. The present invention employs a sync processor (26) which will accurately phase lock a master pixel clock (30) with the incoming video signal. The time position or phase of a horizontal line, as defined by time between horizontal synchronization pulse intervals, is compared with the time position of a regenerated horizontal line length. The regenerated line length is derived from one of a plurality of input parameters supplied by the software script contained in system memory (14) of microprocessor (11). A plurality of such regenerated pulse events constitute a video signal template having a time position controlled by the pixel clock. All pulse events in the input video signal template are regenerated from the parameter lists independent of the incoming video signal. Sync processor (26), upon initialization by the operator, will be loaded with a selected group of input video signal parameters. Sync processor (26) will then compare the incoming video active line period with a regenerated active line period based upon a loaded parameter relating to the active line interval. An error signal, representative of the error between a regenerated pixel rate and video signal pixel rate, is determined by comparing the time interval of the line signal delineated by horizontal synchronization pulses, and a regenerated line interval based upon a script supplied parameter. This error signal is used to phase lock a master pixel clock (30) to the incoming video signal. This in turn moves the entire video template in alignment with the incoming video signal.

Using regenerated video signal pulse events of the video template instead of demodulated synchronization pulses, back porch, front porch, first and last lines of a field, etc., improves signal jitter and instabilities which result from demodulating these active pulse events from the incoming video signal.

The master pixel clock signal (30) is supplied to the sync processor. A counter internal to sync processor (26) is driven by the pixel clock and regenerates an active line period bounded by two horizontal synchronization periods. The counter is preset by the script parameter identifying the number of pixels between synchronization periods. Differences between the active video line period of the incoming video signal and the regenerated video line period are used to correct the master clock (30) frequency and phase to achieve a pixel clock frequency and phase, which is precisely aligned with respect to an input pixel rate of the signal received from the host imaging device. Sync processor (26) will provide for regenerated synchronization signals having an amplitude and pulse width independent of the input signal, but which are aligned with the input vertical and horizontal synchronization signals to the graphics engine (18) based on the parameter list selected by the operator.

Having once achieved a master clock pixel rate synchronized with the incoming video pixel rate from the host imaging device, video acquisition may be achieved in module (27). The active video display pixels are first filtered using standard video signal processing in module (24). The resulting filtered video input signal is converted to a series of digital pixels under control of the pixel clock (30) and analog digital signal converter in the video acquisition module (27). Additionally, the video acquisition module (27) receives a reference white level which is included among the parameters selected by the operator so that the digitization will preserve the input signal gray scale. Digitization begins with the first pixel clock pulse following an ENABLE signal from the sync processor. The ENABLE signal indicates the synchronization has occurred between the template and incoming video.

The incoming digitized video frame is then stored pixel by pixel in video display memory (29). An entire frame may be advantageously stored in the video display memory (29). This display memory, in a preferred embodiment, has the capacity to store an image frame of 1024×2048 image pixels of 8 bits per pixel.

Having thus digitized incoming video signal information and stored the resulting pixels in display memory (29), it is now possible to either enhance the image using the graphics engine (18) or reorder the image, such as removing any known alphanumeric characters and permitting the image to be enlarged or reduced without affecting the alphanumeric display information. The alphanumeric characters may then be reinserted over the enhanced image.

The pixel frame stored in display memory (29) may be read out in any line scan format supported by the output parameter lists stored in microprocessor system (11). The pixels may be supplied at a pixel rate, wholly determined by the script supplied parameter list. An output synchronization pattern may also be selected from the parameter list. This output format including synchronization data is selected by supplying the desired pulse duration for horizontal synchronization, vertical synchronization pulses, as well as equalizing and serration pulse durations, to the sync processor (26). An output pixel clock will, once the pulse widths are entered in sync processor (26), supply horizontal and vertical synchronization pulses at the appropriate rate. Amplitude levels for all of the video output pulse events are identified by appropriate parameters which are loaded in the output synchronization module (33).

Thus, it is clear that the present invention can provide for a separate and distinct output display format from that of the input.

The system is, of course, capable of supporting any of a number of input/output display formats selectable by the operator by calling up the appropriate script containing parameters which define the format.

Figure 2:
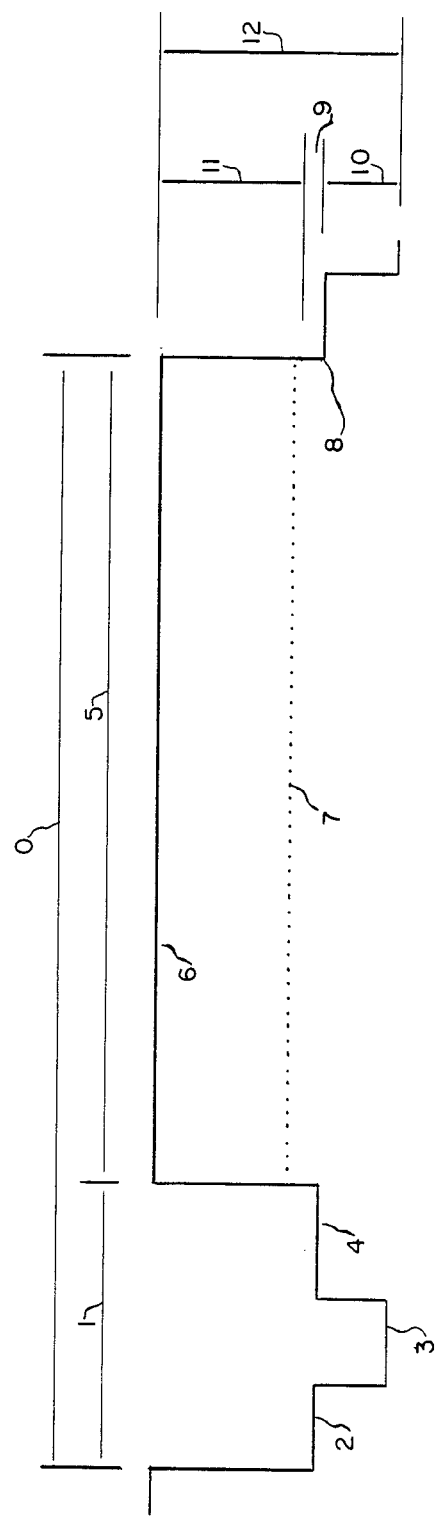
FIG. 2 is a video line of the captured frame, along with identification of the segments of the line which are synthesized by the device.

The capture of the input video signal begins with the system operator selecting from an input/output menu shown on display (13), a particular input video signal format corresponding to the signal provided by the host source. A parameter list may be displayed for the video parameters illustrated in FIG. 2. FIG. 2 will be recognized as a standard line of a video signal in a raster scan television system. A parameter list associated with this particular video format will identify the following pulse events and time durations in terms of a number of pixels:
1. horizontal blanking
2. horizontal front porch
3. horizontal sync pulse
4. horizontal back porch
5. active video
6. reference white level
7. reference black level
8. blanking level
9. set-up (voltage difference between blanking level and reference black level)
10. sync amplitude)
11. video amplitude
12. total composite video amplitude.

These parameters are needed in order to generate an input video signal template to acquire the incoming video signal. FIGS. 3A 3B-1, 3B-2 illustrate the video frame format for an interlaced field and a non-interlaced picture field. The frames can be identified by a number of parameters referenced in the Figures as follows:
1. vertical blanking
2. vertical front porch
3. pre-equalization pulses
4. vertical sync and serration pulses
5. post-equalization pulses
6. vertical back porch
7. active video lines.

Using the foregoing parameters, the sync processor (26) can be configured by the microprocessor (11) to generate all the pulse events associated with the video line and video frame of an incoming signal which constitutes a video signal template independent of the incoming video signal. Additionally, the sync processor (26) will synchronize this template with the active video line period defined by the horizontal synchronization pulses received from the host video source.

As well as there being an input video signal parameter list, there is also an output video signal parameter list. This parameter list contains all the information for identifying the pulse events occurring in an output video frame. This would normally include all the items above necessary for generating an input video template. However, the output video template is synchronized with the first address of the display memory which contains pixel 1 of a video frame to be displayed.

The parameter list for both the input and output video templates are selected by the system operator. The script is a series of commands which must be executed internally as part of the system program for a given interface transaction. The content of each script is dependent on the interface function to be performed. The use of a script to configure an input video format as well as an output video format provides significant versatility for capturing input video signals of diverse formats and converting these input video signals to a different format. If the preferred embodiment of the invention, there may be up to eight different scripts, each of which includes at least 16 executable commands. The quantity and complexity of the scripts will necessarily change, depending on the degree of versatility of the installation. The scripts always contain the following functions:
(a) acquisition of an image from a host video device including an input video parameter list;
(b) processing and reformatting the image into a specific digital image file, including resizing, changing aspect ratio, etc;
(c) transferring the reformatted image out of the interface to a receiving and display device, having a format compatible with the display device.

Figure 4:
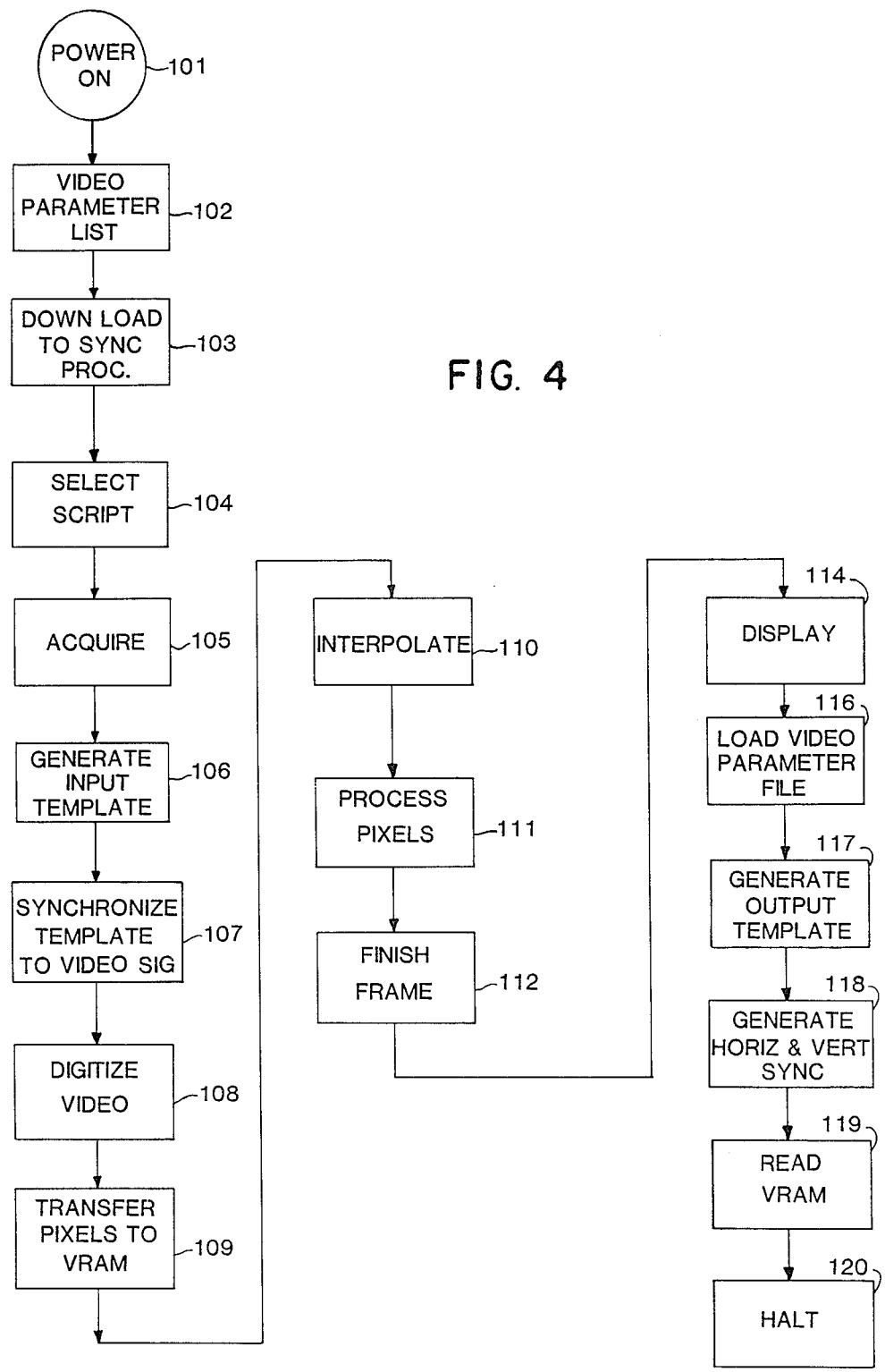
FIG. 4 illustrates the script execution of the menu driven software.

Execution of a basic video script is illustrated more specifically in FIG. 4. The first of these is shown in step 101 as the POWER ON stage, wherein the device is initially powered up. At this time, if the operator has not selected a particular video parameter file, a default video parameter file is entered in step 102. Either the default video parameter file or actually selected video file is downloaded in step 103 to the sync processor. The sync processor will regenerate the input video template as well as the output video template, completely identifying each pulse event contained in the video frame for both the incoming video signal and desired output video signal format.

In the preferred embodiment, a remote control device may be supplied which will permit selection of one of eight particular scripts as shown in step 104.

All scripts include three executable functions which can be summarized as an ACQUIRE, INTERPOLATE and DISPLAY modes. During the ACQUIRE mode, step 105 will produce an input video template locked with the incoming video signal in step 106 after downloading the parameter lists to the sync processor. The sync template for the incoming video signal, once having been phase locked in step 107 to the incoming video signal, will then initiate digitization of the incoming video signal in step 108. This includes enabling the analog to digital converter when pixel 1 is detected as being received. Once the digitization of the incoming video signal commences (the digitization of active video only), pixels are transferred in groups of four pixels to the video RAM, beginning at an address specified by the script. This address will most commonly be (0,0), however, other scripts may start the storage at a different location in video RAM.

Once a complete frame of pixels has been stored in the video RAM, the script will enter the interpolate portion of the function. To interpolate means to convert the stored pixel data in the video RAM to a desired image size, aspect ratio, etc. The interpolation of step 111 will employ standard algorithms to remove pixels on a line by line or column by column basis in the video RAM, interpolate them to the new video image size, and restore each of the interpolated pixels in a selected output format in accordance with the script. Once a complete frame has been finished in step 112, the system will enter display mode 114 for outputting video data from the video RAM in the selected output video format. At this time, the output video parameter file can be downloaded into the sync processor in step 116 the template configured in step 117 for the output video signal. This template will provide HORIZONTAL ENABLE, VERTICAL ENABLE and other pulse ENABLE events to regenerate the horizontal and vertical sync pulse durations in step 115, as well as all the other video pulse events identified for the output signal. The video RAM is read out in step 119 beginning with the first pixel address at a time determined from examining the output template. The beginning address for the video RAM is also contained in the display script.

The device will continuously read out the pixel data contained in the video RAM in accordance with the output script, thereby providing a continuous display signal.

Figure 5:
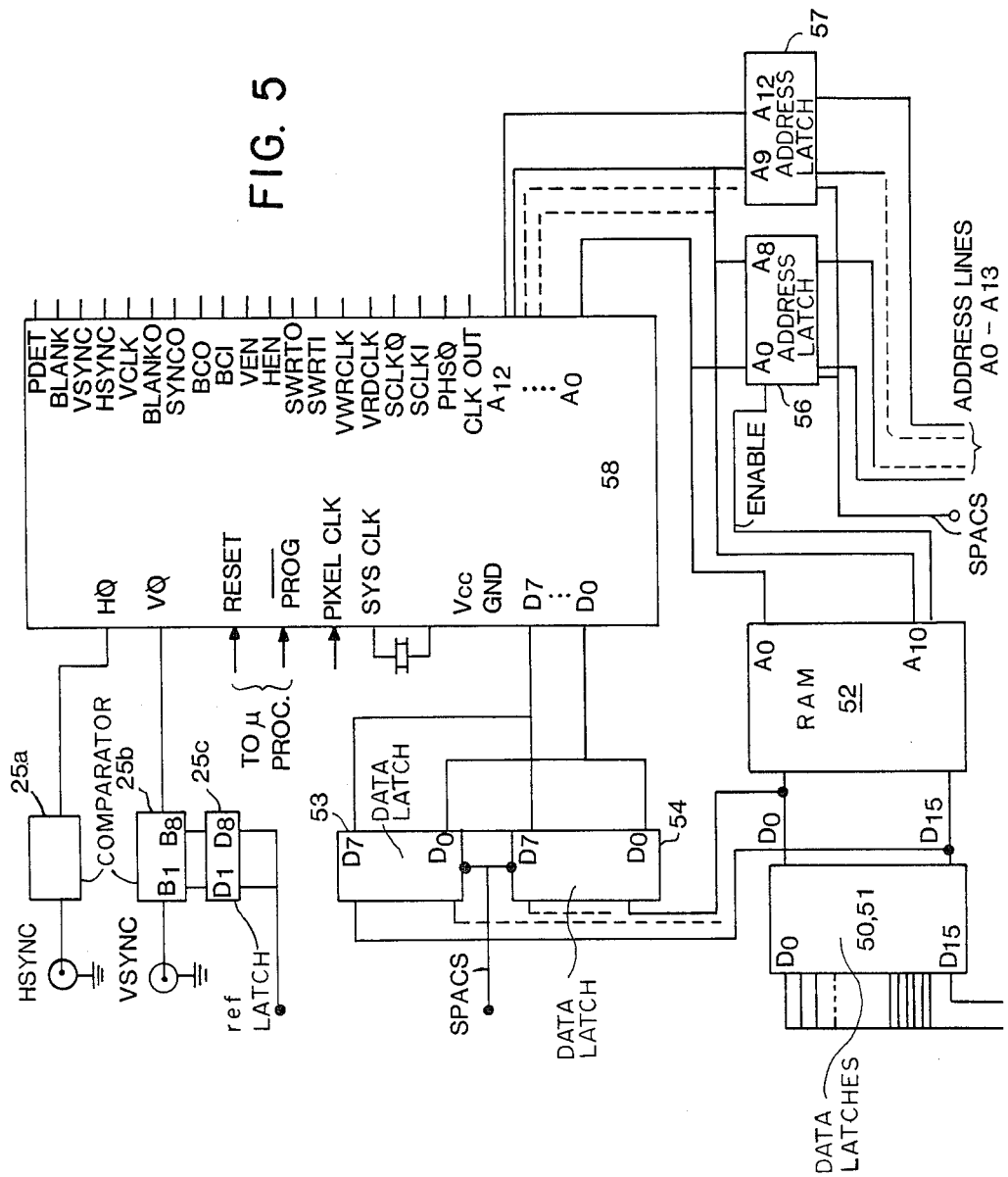
FIG. 5 is a detailed illustration of the sync processor.

Referring now to FIG. 5, the sync processor (26) is shown in more detail. A single cell contains a plurality of presettable counters driven by the pixel clock (30) for generating each of the time intervals shown in FIGS. 2 and 3. The sync processor (26) includes a programmable array (58) which is a XYLINX 2018 gate array. The gate array (58) is configured with script parameters from the microprocessor to generate a video template for the input video signal. Additionally, all the pulse events required for the output selected video template are generated by the sync processor. The sync processor programmable array (58) can be programmed to include a plurality of counters driven by the pixel clock. The counters are each presettable to define all the necessary time intervals for the video input signal template and video output signal template. In the preferred embodiment, 2018 bytes of parameters are loaded from the microprocessor, in a procedure to be explained, into the programmable array (58).

The programmable array (58) also receives the horizontal sync pulses from the host video image device. A period between each horizontal synchronization period, defining the active line period of the video signal shown in FIG. 2, is compared with the regenerated active line period of an appropriate counter driven by the pixel clock within array (58). These two active line periods are compared and an error signal is used to modify the phase of the pixel clock, bringing the two active line periods into agreement.

The pixel clock thereafter being phase locked with the incoming video signal drives all the presettable counters to generate all the time events represented on the input video signal, constituting a template for this signal. Additionally, the output format parameter script is also written into a separate set of counters, driven by a clock which is scaled from the pixel clock signal to derive an output pattern or template for the output format selected by the user.

The totality of signals representing an input template and output template are shown in FIG. 5. The first of these includes BLANK VSNC HSNC which are blanking signals, vertical synchronization signals, and horizontal synchronization signals emulating the input video signal waveform. A video clock is provided which is a scaled version of the pixel clock for the graphics engine (18). Output template signals include the BLANK O and SYNC O signals shown. The outgoing digital-to-analog converter will be synchronized in accordance with this selected format so that during all blanking and synchronization intervals defined by the output video signal format, no conversion of the signal from digital to analog occurs.

BC0 and BC1 represent a back porch clamp interval signal for the video acquisition module. Those skilled in the art will recognize that input video signals are usually clamped prior to any further signal processing to establish black levels and other important amplitude conditions.

VEN and HEN are enables which occur during vertical and horizontal synchronization periods of the selected output format. When asserted, the signal will enable a set of latches, on the output synchronization module, containing a digital representation of an amplitude level. These amplitude levels correspond to the appropriate video signal amplitude during vertical blanking and horizontal blanking.

Figure 3A:
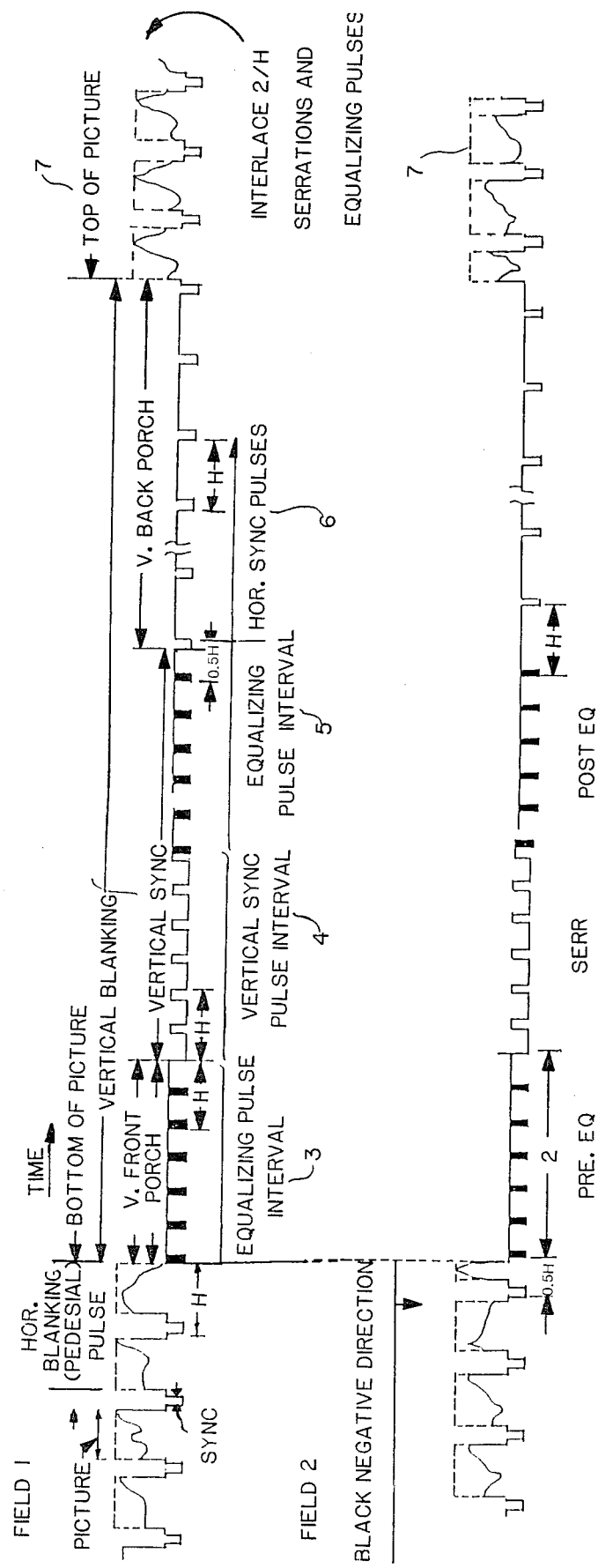
Figures 1, 3B:
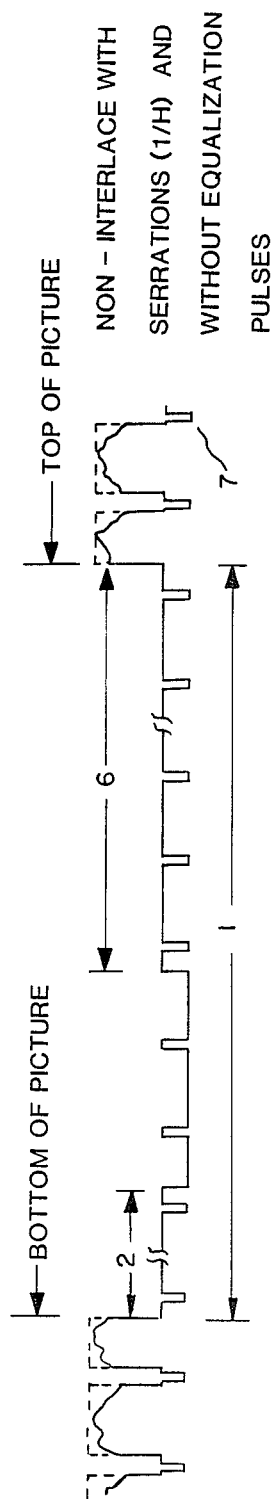
Figures 2, 3B:
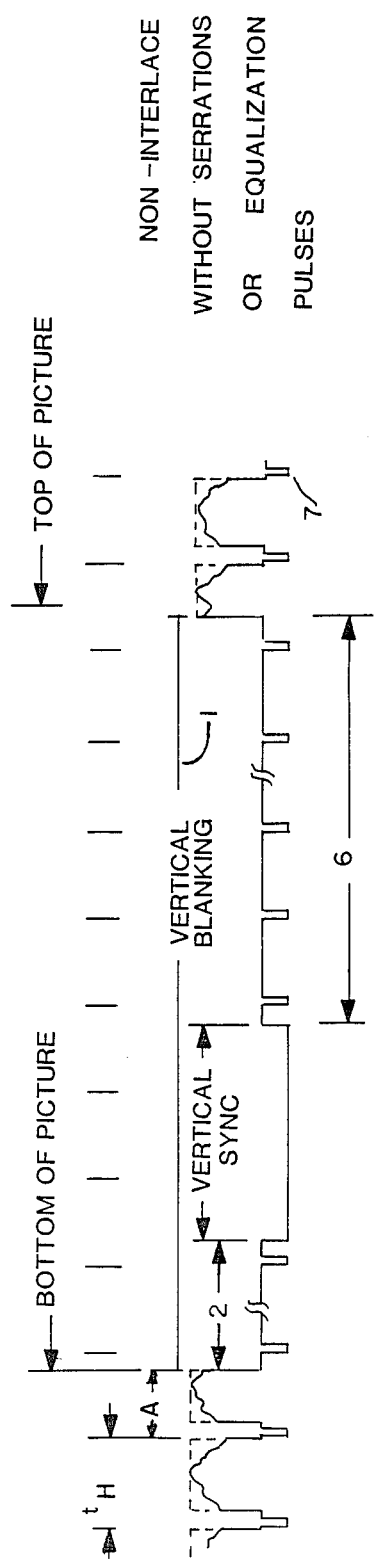

Additionally, SWRT 0, SWRT 1 also control four extra latches on the output video card to identify the time occurrence of sync tip, the top of the sync pulse black offset level identified in FIGS. 2 and 3, as well as the presence of serration or equalizing pulses.

Figure 6:
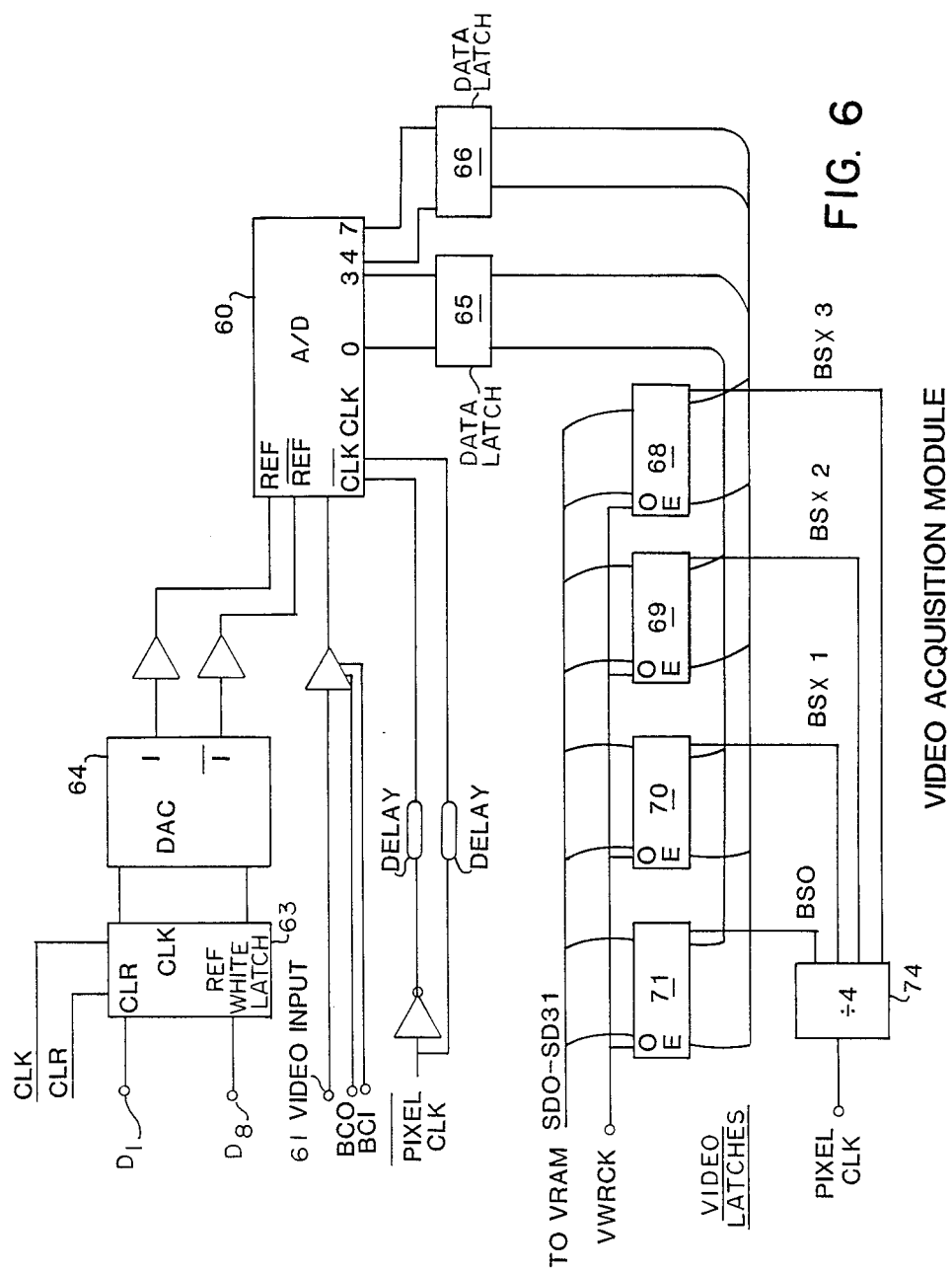
FIG. 6 illustrates the video input processor for digitizing the incoming active line information.

Further, VWR CLOCK is a video write clock which enables the data latches shown on the video acquisition module (27) of FIG. 6. When the first pixel to be stored in the video RAM is identified following the vertical interval, VWR CLOCK remains enabled until all the pixels in a frame have been digitized and stored in the video RAM. The identity of the first and last pixels are identified by the operator script. When these latches are enabled, output data may be serially written to the video RAM from each of the four data latches on the video acquisition module.

The shift clock shown, SCLK 0 and SCLK 1 provide a clocking input to the serial I/O port of the display memory (29) so that data from the output latches on the video acquisition module are sequentially read into each addressed location.

PHSO identifies the phase error derived for controlling the pixel clock, resulting in alignment of one input video signal template with the video input signal.

The H$\phi$ and V$\phi$ signals provide the horizontal and vertical synchronization signals from the host video signal device. The vertical signal identifies the beginning of a frame of video signals, and the horizontal synchronization pulse identifies the beginning of each line. The vertical sync signal can, of course, reset the counters n array (58) at the beginning of each vertical field or frame, and the horizontal sync signal, as was previously explained, is used to derive the phase error for the pixel clock. Comparators (25a) and (25b) are used to convert incoming synchronization voltage levels to logic levels for the array (58). Latch (25c) permits the reference potential for comparator (25b) to be set by a script supplied parameter.

The script parameters, loaded into the array (58), are derived from a 4K static RAM (52). The 4K static RAM receives the 2018 bits of data identifying all the pulse events to be generated by array (58) as a DMA transfer from the microprocessor. The 4K static RAM (52) is connected through address latches (56) and (57), and data latches (50) and (51) to the microprocessor data bus line and address line. When the microprocessor asserts the SPACS line as a decoded output, data is transferred in a DMA transfer from the microprocessor to the 4K static RAM4 (52). At the conclusion of this DMA transfer, identified by the protocol associated with DMA transfers, the script parameters may be loaded from the 4K static RAM (52) into the array (58). This occurs as the SPAC line returns to an unasserted state and a decoded output from the microprocessor asserts the PROG line and permits the RESET line to go high. The reset line shown for the gate array (58) controls an address counter which has addresses connected through lines A0 and A12. The address counter also counts input pixel clock signals, deriving therefrom an address for the 4K static RAM (52). Once the microprocessor de-asserts the RESET line, the address counter is free to count consecutive addresses for addressing the static RAM (52).

At this time, the data latches (53) and (54) transfer each read memory location from 4K static RAM (52) into the gate array (58). Address registers (56) and (57) are inhibited, as well as data latches (50) and (51), isolating the data inputs and address inputs of gate array (58) from the microprocessor address and data bus.

Thus, the gate array (58) is seen to program itself from the contents of the static RAM (52).

Once the programmable array (58) has received the parameters constituting the input video template, it starts generating the video template. It adjusts the phase frequency of the pixel clock so that the input horizontal synchronization pulses are in lock with the template generated horizontal synchronization pulses.

The first received vertical synchronization pulse resets the vertical synchronization counter of the array (58). The first of these resets provides an output PDET to the microprocessor (11). This signal is used to mark the beginning of acquisition, enabling the digital to analog converter to start conversion of incoming analog pixels to digital pixels.

Referring to FIG. 6, there is shown an analog-to-digital converter (60) connected to receive as an input a video input signal on terminal (61). The analog-to-digital converter also receives a reference white level which was identified in the input parameter list, and includes the amplitude level noted in FIG. 2 which is the maximum white level expected from the host video source.

A digital quantity, identified in the parameter list as the reference white level, is transferred from the microprocessor to the input latch (63) on data lines D1-D8. The input latch (63) will provide this digital reference white level to a current controller (64). Current controller (64) establishes a preset analog current level, identified as reference white. This signal level is applied to the analog digital converter (60). The reference white level references all of the incoming analog video amplitude levels during the digitization of the video signal.

The analog digital clock AD CLK is derived from the pixel clock signal. There is a minor time delay offset between the pixel clock and the AD CLK to be certain the amplitude signal level is sampled at the middle of a pixel period. This is accomplished by running the A/D on pixel clock inverted signal $\overline{CLK}$.

The output of the analog-to-digital converter is applied to first and second data latches (65) and (66). The contents of these data latches are transferred in sequence under clocking by signals BSX0, BSX1, BSX2 and BSX3 from divider (74) as an 8-bit wide word into a series of video latches (68), (69), (70) and (71). Thus, bytes of pixels are arranged in each of latches (68) through (71). By addressing the latches (68) to (71) from microprocessor (11), four consecutive 8-bit pixels of a line can be transferred to the video AM as one 32-bit transfer. A video write clock signal VWRCK will permit the latches to be written during the time identified by VWRCK.

Having thus converted the incoming analog active video into a plurality of pixels, each amplitude referenced to the white level amplitude of the incoming video signal, as well as time referenced to its horizontal synchronization pulse leading edge, the pixel data can be relied upon as both precise in gray scale, as well as in time registration with respect to other pixels. The contents of time latches (68) through (71) are transferred as a group by the VWR CLOCK to the input of a video display memory (29), as shown in FIG. 1. The video display memory (29) is organized to provide a bit mapped display memory (29) for containing all the pixels of a single frame. The present invention finds particular use with single frame display systems such as used in radiology and other medical imaging systems. A clock signal SCLK 0 and SCLK 1 is applied to a serial input output port of display memory 29 to shift the pixels into the display memory (29).

Figure 7:
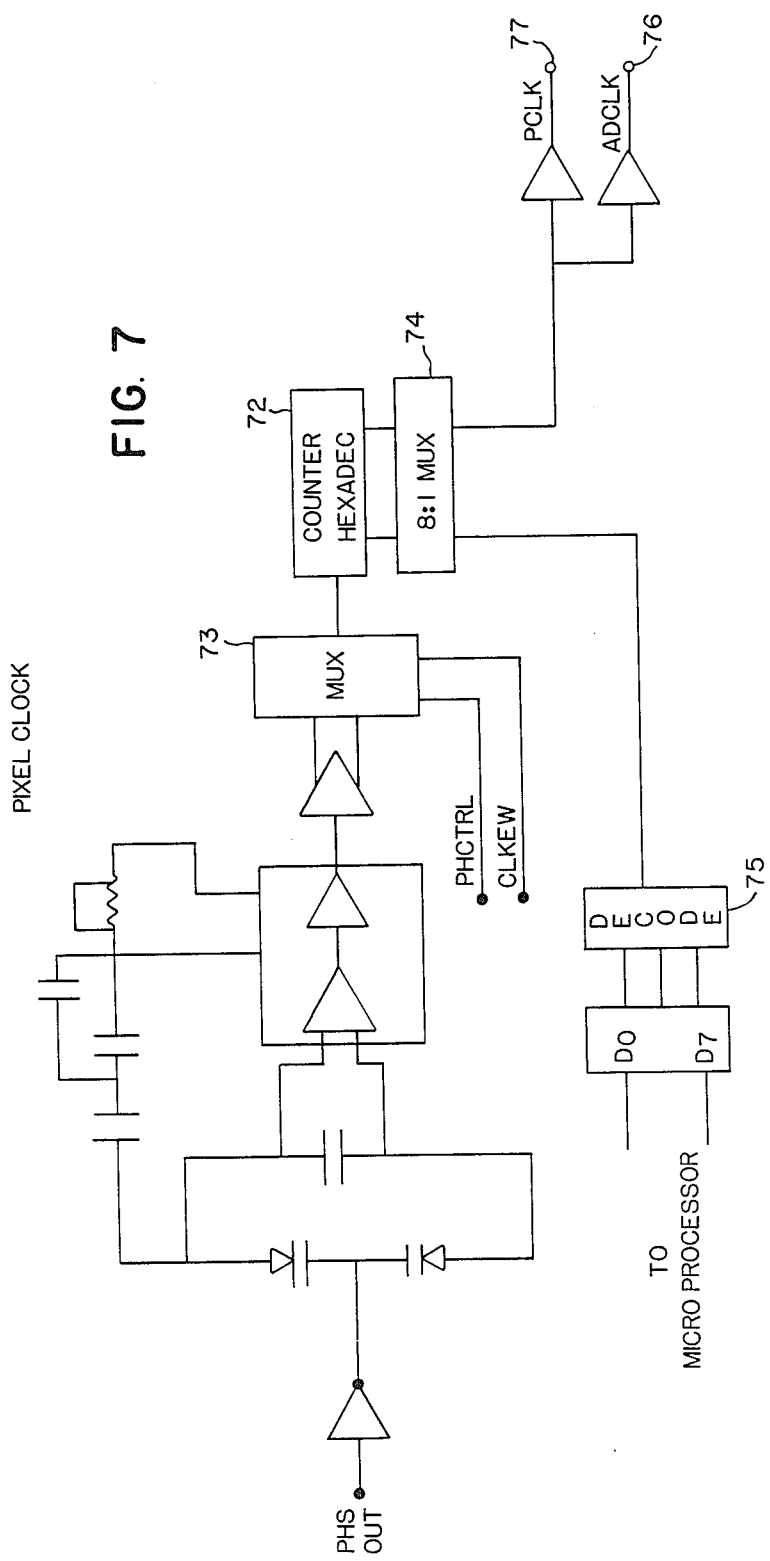
FIG. 7 illustrates in more detail the pixel clock circuit for accurately regenerating the incoming video signal.

The pixel clock which is synchronized with the period between each incoming horizontal synchronization pulse is shown more particularly in FIG. 7. FIG. 7 comprises a phase controlled oscillator (71) which, under control of the error signal from the sync processor (26), will phase lock the pixel signal to the incoming video signal active line period bounded by incoming horizontal synchronization pulses. The pixel clock signal is divided by a hexidecimal counter (72) via MUX (73). The pixel clock rate may be selectable between 100 and 0.75 MHz., depending upon the decoding signal applied to the 8 to 1 MUX (74). The clock ranges may be as follows: 100–50 MHz; 50–25 MHz; 25–12.5 MHz. The signals from the microprocessor (11), representing the nominal pixel rate of a parameter list, are decoded in decoder (75) to select an operating frequency for the pixel clock. The selected pixel clock signal is then provided on two outputs, one as a pixel clock output (77) and the other as an A/D clock output (76). AD clock output (76) is used in the analog-to-digital converter of FIG. 5. Thus it is possible, using any selected pixel rate within the operating frequency range of pixel clock (6) to select a pixel clock rate which will be phase locked to the incoming horizontal synchronization period.

An entire frame of the digitized video signal whose beginning and end and intermediate lines are identified by video template signals from the sync processor is stored in display memory (29). The video frame in display memory (29) may be processed in any familiar graphics enhancement techniques. The graphics engine (18), shown with a multiplier and accumulators (19) and (20) and its required random access memory (21), can change the size of the picture frame, change an aspect ratio, provide for a zoom function on certain areas contained in the frame, as well as process the alphanumeric overlays which may occur with the frame separate from the image data. The Texas Instruments graphics engine (18) may provide any of these enhancements in accordance with its manufacturer's published application notes. The output clock signal is derived by dividing the system clock signal to obtain a line period HREF which is within a desired line time. The array (58) will lock the output signal template to the line period HREF. The display memory (29) containing a frame of pixels is available for display in either analog or digital form.

A serial port interface (45) or parallel interface (46) will permit the display memory (29) contents to be transmitted via a serial port or other interface to a peripheral device such as a magnetic diskette memory or other data processing unit for storage and display.

The individual pixel data contained in display memory (29) may be converted to an output format wholly independent of the input format. Each pixel may be addressed by the graphics engine (18) and applied as the input to a lookup table (32) or directly, at the users' option, to the serial port interface (45), parallel port interface (46) or directly to the video output module (34). Lookup table (32) either may be preprogrammed or programmable to provide a gray scale level and contrast for any selected output video format. The microprocessor (11) script will tell the user which output parameters are available to him, at which point lookup table (32) can either be programmed, or alternatively one of a plurality of such lookup tables may be selected under control of the microprocessor (11). In any event, the actual pixel data is converted to a video level by the lookup table (32). A digital-to-analog co-verter in video output module (34) will provide the requisite analog signal for display.

The output video signal synchronization signals may be provided by sync output generator (33). In this situation as well, the script specifies a given output format parameter list generated by the microprocessor (11) and displayed on display (13). This parameter list will specify all the pulse durations and amplitudes necessary to generate horizontal and vertical synchronization signals. The sync output module (33), receives the data representing pulse levels for the output video signal.

Figure 8:
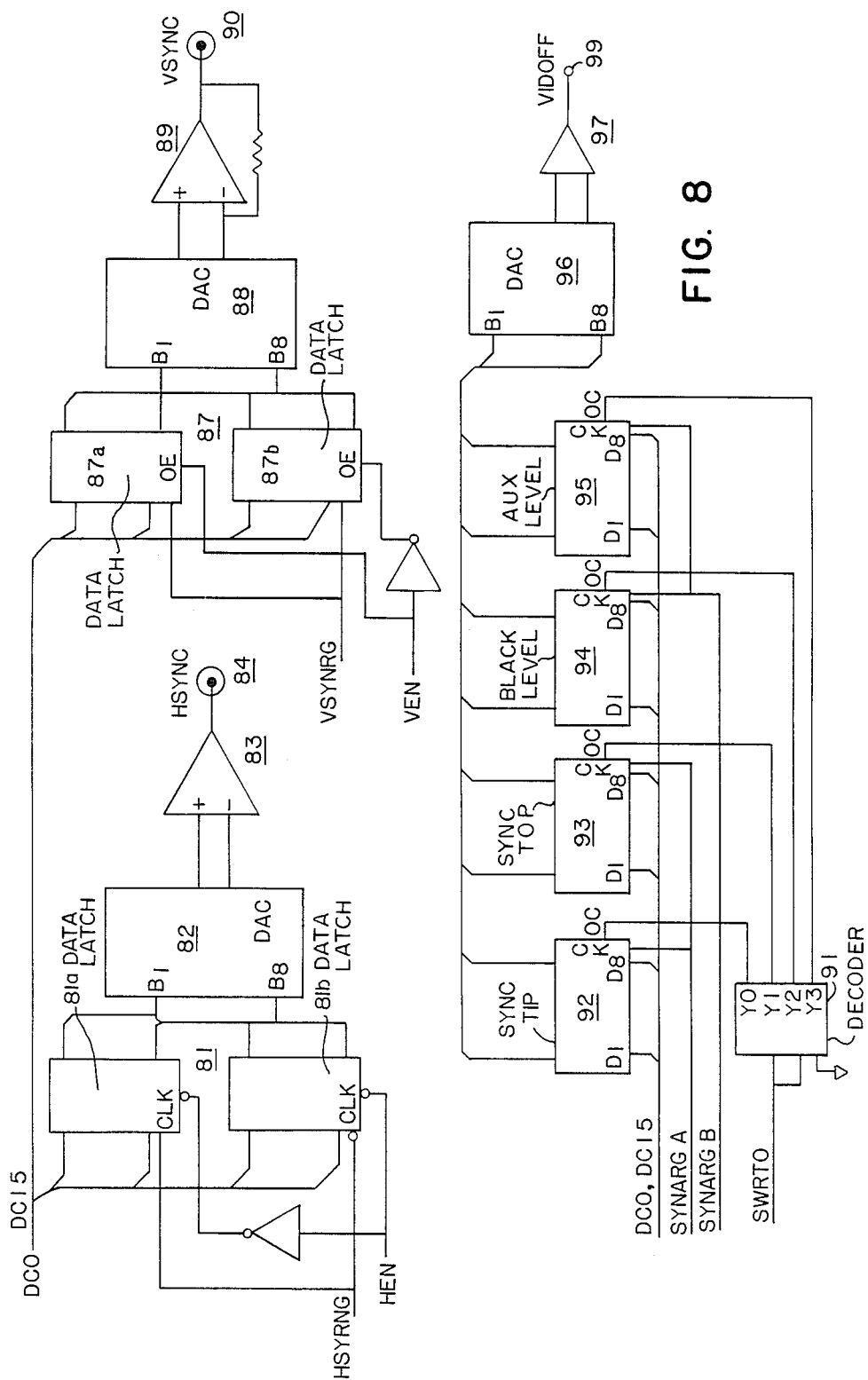
FIG. 8 illustrates the sync output circuit for selecting any of a number of output synchronization formats.

The sync output module is shown more particularly in FIG. 8. FIG. 8 illustrates a pair of latches (81) and a second pair (82), identifying the amplitude levels for the output synchronization pulses. The data for specifying these amplitude levels is provided by the microprocessor (11) from the parameter list. Enable signals for these latches VEN, HEN are provided by the microprocessor so that the leading edge for each of these events is synchronized with the active video being produced from video output module (34). When either a horizontal or vertical pulse is to be generated, sync processor (26) will generate either the VEN or HEN enables. Additionally, an output clock signal is provided from the sync processor for transferring pixels at the appropriate formatted output display to the video conversion device.

Referring to FIG. 8, there is shown circuitry for generating the required signal levels for each of the pulse events in the output signal template. In FIG. 8, there is shown a pair of eight bit latches (81a and 81b) which receive two output parameters during execution of the script which specify the voltage level during a horizontal sync event, and during the active video line. Each of these script levels are loaded in the respective latches (81a and 81b).

Similarly, a pair of eight bit latches (87) is shown for receiving data during execution of the script wherein parameters are downloaded to configure the level during vertical interval. A first of the latches (87a) will provide an eight bit representation of the output voltage during vertical sync. Latches (87b) will provide an eight bit identification of the signal level during other portions of the video frame. The respective parameters are clocked into the pairs of latches (81 and 87) under a clocking signal HYSRNG and VSYNRG from the microprocessor during execution of the script. The clocked data is presented to one of two DACs (82 and 88) when the output ENABLE line is raised on a given latch. These output ENABLEs are asserted in response to the HEN and VEN signals generated by the sync processor. HEN is a signal which occurs during the horizontal blanking interval of the output video template. VEN occurs during the vertical blanking interval of the output video signal. These pulse events HEN and VEN are generated in response to the given parameter identifying these two intervals of the video signal.

The presented latch contents are converted to an analog voltage by DACs (82 and 89). The driver amplifiers (83 and 89) provide the regenerated horizontal and vertical sync pulses to a pair of standard connectors (84 and 90).

The remaining portion of FIG. 8 illustrates circuitry for generating an output template for the pulse events of the output video signal when it is necessary to provide a composite video signal. The connector (99) provides the signal VIDOFF which contains all the pulse events for summing with the active video produced by the circuit of FIG. 9.

This circuitry includes a plurality of latches (92, 93, 94 and 95) which will be loaded with data during execution of the output script. The microprocessor will clock during an interval defined by SYNARGA data representing the sync tip into latch (92). Additionally, during this time interval the top of the sync pulse will be identified by data clocked into latch (93). Latch (94) contains data which is latched during a time interval SYNBRG defined by the microprocessor during execution of the script loading the output parameters, into latch (94). The contents of the latch (94) represent the black level offset of the active video. A further latch (95) is provided which can store other data identifying yet another level of the output signal. However, in the current embodiment, the additional latch is not used, as all levels are accommodated by latches (92 through 94) and latch pairs (81 and 87).

During a display mode the SWRT0 and SWRT1 signals from the sync processor is decoded. The sync processor has been previously programmed with parameters from the output parameter list to generate a coded output whenever sync tip is present, the top of sync tip is present, or any equalizing pulse or serration pulse. Equalizing pulses and serration pulses are typically given the same level as sync tips during horizontal synchronization periods. Therefore, the parameter list loaded in the sync processor will identify each of these pulse events contained in the output template. A decoder (91) will assert the output ENABLES for each of the latches (92, 93 and 94) during the time interval identified by the sync processor, corresponding to one of these events.

A further DAC (96) converts these applied digital levels to the driver (97). Thus, it is possible to reconstitute and add to the active video signal all of the regenerated template signals. The timing for all these signals is provided by the sync processor having been programmed with the output parameter list. Levels for each of the timed events are provided by the circuitry of FIG. 8.

Figure 9:
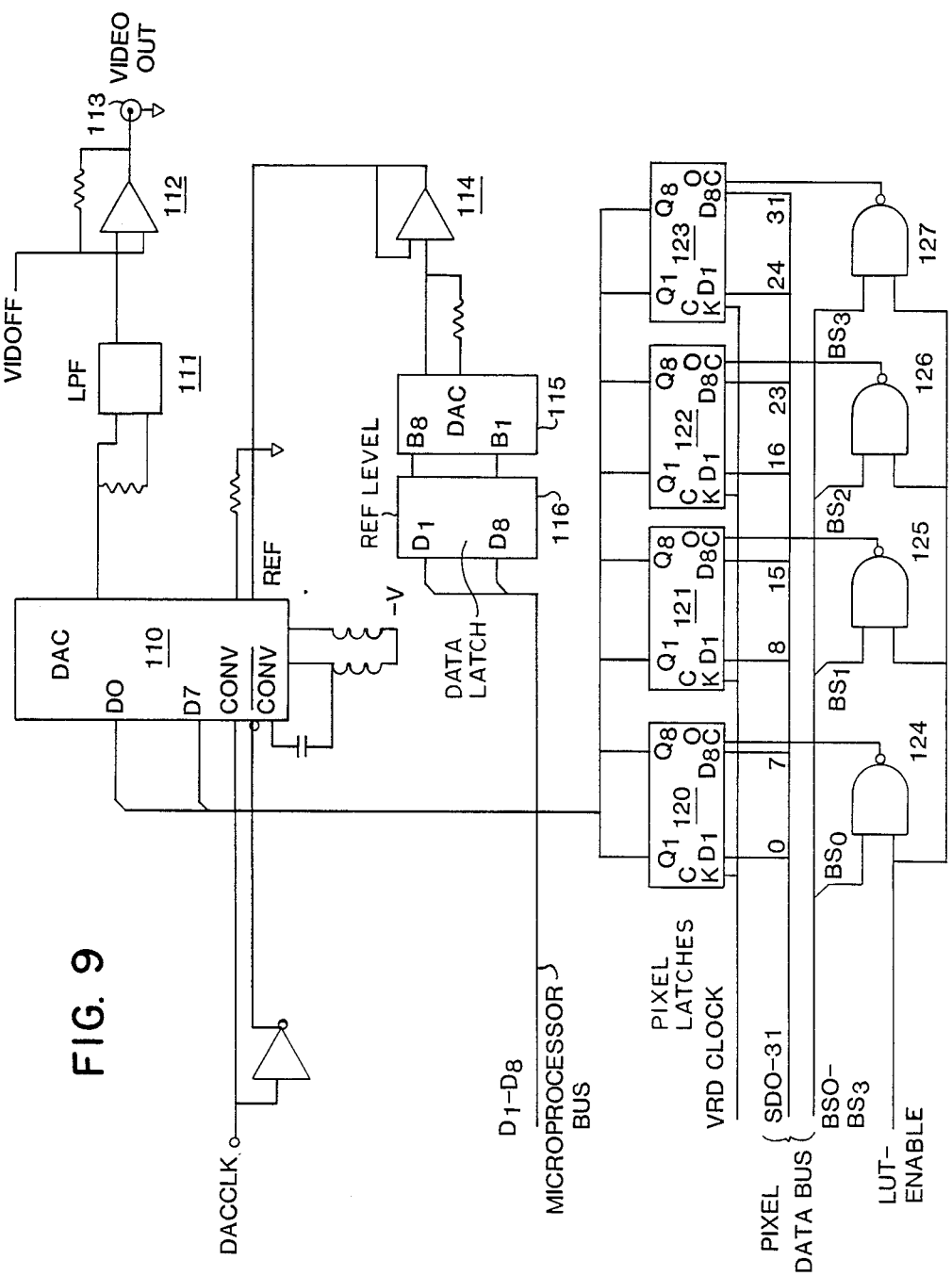
FIG. 9 illustrates the video output circuit for generating the output active video.

Referring now to FIG. 9, there is shown the circuitry for storing and displaying active video from each of the pixels contained in the display memory VRAM. The display memory VRAM contents are read out as a 32-bit number comprising four pixels. A read clock VRDCLK clocks in the 32-bit parallel pixel data into each of latches (20, 121, 122 and 123). VRDCLK is the signal generated from the sync processor, identifying the time to write a bank of four pixels into each of the latches (120, 121, 122 and 123).

The output pixel rate is scaled in the sync processor and four signals, BS0 through BS3 are generated to enable the outputs of each of the latches (120, 121, 122 and 123) in a sequence for displaying the pixels at the appropriate rate. Each of these ENABLEs is applied through NAND gates (124, 125, 126 and 127) along with an LUT ENABLE signal. When displaying pixel RAM data, the lookup table is not used and the BS0-BS3 signals are used to enable each of the latches (120-123). The clocking rate for the VRAM data is approximately one-fourth the output pixel rate. Thus, during one complete clock cycle for reading VRAM data to the latches (120, 121, 122 and 123), each of the signals BS0, BS1, BS2 and BS3 occurs. The four latches (120, 121, 122 and 123) are sequentially presented to the DAC (110) at the selected output pixel rate.

A set of latches (116) is also loaded with a parameter during a script execution for identifying a reference level for the DAC (110). A DAC (115) converts the reference level for application through driver (114) to the DAC (110).

The DAC (110) is operably connected to a source of clock pulses DACCLK. The DACCLK rate is regenerated from the output pixel clock rate.

A low pass filter (111) removes any of the artifacts produced during the conversion from digital to analog. Amplifier (112) combines the composite video template VIDOFF with the active video, providing a single composite video output.

Thus, there is described an embodiment of the invention described more particularly by the claims which follow.

What is claimed is:

1. A video interface for receiving a video input signal of one format and deriving an output video signal of another format comprising:
    a microprocessor control system for generating a parameter list identifying the signal parameters of said input video signal including a pixel rate and a video signal line length, and for generating a parameter list identifying the signal parameters of said output signal, including the duration of horizontal and vertical synchronization pulses;
    a pixel clock which is presettable to generate a pixel clock signal in accordance with said input parameter list, said pixel clock including a phase control input for receiving an error signal;
    a synchronization signal processor for receiving synchronization signals related to said input video signal which identify an active line period and for receiving said pixel clock signal, said signal processor regenerating a local active line period signal identified by one of said parameters from said pixel signal, and including means for comparing said regenerated active line period signal with said horizontal synchronization signals to derive said error signal for said pixel clock;
    an analog-to-digital converter for receiving said input video signal and said pixel clock signal and generating a digital pixel value of said video signal under control of said pixel clock;
    a graphics engine;
    a display memory for storing each of said pixels having pixel values as a frame of pixels under control of said graphics engine;
    an output synchronization generator for generating output horizontal and vertical synchronization pulses from said output parameter list; and,
    a digital-to-analog converter connected to receive said frame of pixels at an output pixel rate determined by said output parameter list in synchronization with said output synchronization generator horizontal and vertical synchronization pulses and converting said pixels to an analog voltage.

2. A video interface for receiving a video input signal of one format and deriving an output video signal of another format comprising:
    a pixel clock generating a signal having a frequency presettable to pixel rate which is related to the pixel rate of an incoming video signal and having a control input for adjusting the phase of said pixel clock;
    a sync processor for receiving a horizontal synchronization signal related to said incoming video signal and said pixel clock signal, said sync processor generating from said pixel clock signal a regenerated active line period signal, said sync processor including a phase detector means for comparing a period defined by said related horizontal synchronization signal with said regenerated active line signal period and deriving an error signal for said pixel clock, whereby said pixel clock phase is changed to reduce a phase error between said compared periods; an analog-to-digital converter for receiving said video signal and converting said video signal into a plurality of digital pixels in synchronization with said pixel clock signal;
    a display memory for storing said pixels;
    a graphics engine connected to said display memory and said analog-to-digital converter for transferring said pixels to and from said display memory, forming a frame of said pixels;
    an output synchronization signal generator for generating synchronization signals related to said output video signal; and
    a lookup table for generating said output video signal from each of said stored pixels which are sequentially read by said graphics engine from said memory in synchronism with said output synchronization signals.

3. The video interface of claim 2 further comprising a digital-to-analog converter connected to receive said output signal and convert said signal to an analog video signal.

4. The video interface of claim 2 wherein said means for generating said output video signal is a lookup table which converts said digital pixels to a video signal.

5. A video interface for capturing a video signal frame and reformatting said frame in a different signal format comprising:
    a microprocessor control system for storing parameters identifying a plurality of formats for an input video signal, including a raster line length and the width of synchronization pulses which terminate said raster line and for storing output parameters defining an output video signal;
    a pixel clock having a presettable frequency and controllable phase;
    a synchronization signal processor connected to receive said input video signal parameters from said control system and a signal from said pixel clock, regenerating from said pixel clock signal a video template identifying a plurality of synchronization signals having a duration identified by said input video signal parameters, said sync processor further including a comparator for comparing one of said regenerated signals with a synchronization signal component associated with said video frame signal and producing an error signal based on said comparison for modifying the phase of said pixel clock to reduce said error, whereby said video template is brought into synchronism with said input video signal parameters;

an analog-to-digital converter connected to digitize said video frame signal, producing a number of pixels which occur in time synchronism with said pixel clock;

a memory for storing said pixels;

a video signal processor connected to receive said regenerated signals and for storing said pixels at consecutive memory locations within said memory; and, said video signal processor reading said pixels from said memory at a rate determined by said output parameters relating to an output format received from said microprocessor control system.

6. The interface device of claim 5 further comprising a lookup table for converting said pixels read from said memory to a gray scale level identified by said parameters.

7. The interface device of claim 5 further comprising a digital-to-analog converter for converting each pixel of said memory to an analog voltage level.

8. The interface device of claim 5 wherein some of said parameters identify an output format and said sync processor regenerates output synchronization signals based on said parameters.

9. The interface device of claim 5 wherein one of said parameters identifies a reference level for said analog-to-digital converter.

10. A video interface for receiving a video input signal of one format and deriving an output video signal of a second format comprising:

a microprocessor operating system for executing instructions which initiate an acquisition of said input video signal, and a display of laid video signal, instructions including a first list of parameters for identifying said input video signal, and a second list of parameters for identifying said output video signal;

a programmable pixel clock generating a signal frequency selectable to an input video signal pixel rate identified by one of said input signal parameters, and a phase control input;

a sync processor for replicating each of the pulse events of said input video signals, said sync processor including means for generating time interval synchronized with said pixel clock signal, from one of said input signal parameters which defines the active line period of said input video signal, means for comparing said active video signal line period with said time interval, and means for generating a phase error signal based upon said comparison for correcting the phase of said pixel clock, and means for generating a remaining group of time intervals identifying each pulse event in said input video signal from said first list of parameters, and for generating a plurality of output video signal synchronization signals from said second list of parameters;

digitizing means connected to receive said input video signal active line portion and a digitizing signal synchronized with said pixel clock signal, and generating in response thereto a plurality of digital pixels;

a memory for storing each of said plurality of digital pixels as a frame of image data;

a graphics engine for reading said video image frame of data from said memory at a pixel rate identified by said output parameters in synchronization with said output synchronization signals; and, means for converting each of said digital pixels of said frame to a gray scale level constituting said output video signal.

11. The apparatus of claim 10 wherein said graphics engine is programmed to enhance said video image.

12. The apparatus of claim 10 wherein said means for converting is a lookup table programmed from said output parameter list.

13. The apparatus of claim 10, further comprising a programmable output synchronization signal generator for generating synchronization signal levels identified from said output parameter list. for generating said output video signal is a lookup table which converts said digital pixels to a video signal.

14. The video interface of claim 1, 2, 5 or 10, further comprising o digital data input/output port for transferring said stores pixels to an external digital device.

15. The video interface of claim 10 comprising a plurality of lists of parameters for identifying a plurality of different video input signal formats.

16. The video interface of claim 10 wherein said graphics engine is programmed to interpolate said video image.

* * * * *